(12) United States Patent
Janssen

(10) Patent No.: US 6,843,874 B1
(45) Date of Patent: Jan. 18, 2005

(54) METHOD FOR PRODUCING A SUBSTANTIALLY CONTINUOUS, NONPOROUS THERMOPLASTIC COATING AND ARTICLES CONSTRUCTED THEREFROM

(75) Inventor: Annegret Janssen, Lueneburg (DE)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 131 days.

(21) Appl. No.: 09/584,248

(22) Filed: May 31, 2000

Related U.S. Application Data

(63) Continuation-in-part of application No. PCT/EP98/01588, filed on Mar. 18, 1998.

(30) Foreign Application Priority Data

Dec. 1, 1997 (DE) .......................................... 197 53 266

(51) Int. Cl.[7] .............................................. B44C 1/165
(52) U.S. Cl. .............. 156/230; 156/244.11; 156/244.27; 427/148; 427/208.2; 427/365; 427/420
(58) Field of Search ............................ 156/244.11, 230, 156/231, 232, 233, 238, 239, 242, 244.27, 246, 247, 259; 427/427, 424, 208.2, 208.4, 146, 147, 148, 365, 420

(56) References Cited

U.S. PATENT DOCUMENTS

| | | | |
|---|---|---|---|
| 3,239,370 A | | 3/1966 | Thomson et al. |
| 3,377,655 A | | 4/1968 | Kucharski et al. |
| 3,402,086 A | * | 9/1968 | Smith et al. ................. 156/244 |
| 3,421,960 A | | 1/1969 | Arbit |
| 3,496,699 A | | 2/1970 | Quarve |
| 3,573,707 A | | 4/1971 | Reynolds |
| 3,591,069 A | | 7/1971 | Heller et al. |
| 3,595,237 A | * | 7/1971 | Sargent et al. ............... 128/290 |
| 3,596,432 A | | 8/1971 | Straub et al. |
| 3,602,193 A | | 8/1971 | Adams et al. |
| 3,783,072 A | * | 1/1974 | Korpman ................ 156/244.23 |
| 3,856,889 A | | 12/1974 | McConnell |
| 3,904,806 A | | 9/1975 | Waggoner |
| 3,943,022 A | | 3/1976 | Susnjara |
| 4,093,486 A | | 6/1978 | Honkanen et al. |

(List continued on next page.)

FOREIGN PATENT DOCUMENTS

| | | |
|---|---|---|
| CA | 744691 | 10/1966 |
| CA | 814402 | 6/1969 |
| CA | 2235903 | 11/1998 |
| DE | 2 136 815 | 2/1973 |
| DE | 25 02 878 A | 7/1976 |

(List continued on next page.)

OTHER PUBLICATIONS

K.A. Mainstone, "Extrusion Coating and Laminating" in Modern Plastics Encyclopedia: 1983–84, McGraw–Hill, 1983, pp. 195, 196, 198.*
Defensive Publication, USPTO entitled, "Curtain Coating Process," No. 649,025, Apr. 22, 1969.

Primary Examiner—J. A. Lorengo

(57) ABSTRACT

This invention relates to a non-contact coating method for producing a substantially continuous coating and articles constructed therefrom. This invention further relates to a non-contact slot coating method for producing a variety of coatings and laminations. This invention particularly relates to a method of coating a non-porous substrate including film, foil and paper with a molten thermoplastic composition which reduces streaking caused by particles such as impurities, fillers and superabsorbent polymers. This invention further relates to thermoplastic compositions useful in the present non-contact coating method.

31 Claims, 14 Drawing Sheets

U.S. PATENT DOCUMENTS

| | | | |
|---|---|---|---|
| 4,147,580 A | 4/1979 | Buell | |
| 4,183,845 A | 1/1980 | McGee | |
| 4,241,118 A | 12/1980 | Skelton et al. | |
| 4,370,187 A | 1/1983 | Katagiri et al. | |
| 4,407,689 A * | 10/1983 | Ohtsuki et al. | 156/243 |
| 4,418,123 A | 11/1983 | Bunnelle et al. | |
| 4,513,050 A | 4/1985 | Akao | |
| 4,582,151 A | 4/1986 | Mairot et al. | |
| 4,627,847 A | 12/1986 | Puletti et al. | |
| 4,692,161 A | 9/1987 | Puletti et al. | |
| 4,718,898 A | 1/1988 | Puletti et al. | |
| 4,741,949 A | 5/1988 | Morman et al. | |
| 4,854,995 A | 8/1989 | Kasper et al. | |
| 4,913,760 A | 4/1990 | Benson et al. | |
| 4,939,202 A | 7/1990 | Maletsky et al. | |
| 4,987,014 A | 1/1991 | Woodward et al. | |
| 4,998,928 A | 3/1991 | Maletsky et al. | |
| 5,223,311 A | 6/1993 | Tsutsumi et al. | |
| 5,266,394 A | 11/1993 | Diehl et al. | |
| 5,322,908 A | 6/1994 | Hamazaki et al. | |
| 5,342,469 A | 8/1994 | Bodford et al. | |
| 5,359,006 A | 10/1994 | Kulzick et al. | |
| 5,409,733 A | 4/1995 | Boger et al. | |
| 5,422,172 A | 6/1995 | Wu | |
| 5,455,091 A | 10/1995 | Oreglia et al. | |
| 5,458,723 A | 10/1995 | Watkins et al. | |
| 5,510,138 A | 4/1996 | Sanftleben et al. | |
| 5,552,495 A | 9/1996 | Miller et al. | |
| 5,591,154 A * | 1/1997 | Dare et al. | 604/387 |
| 5,591,520 A * | 1/1997 | Migliorini et al. | 428/347 |
| 5,618,632 A | 4/1997 | Watkins et al. | |
| 5,674,342 A | 10/1997 | Obijeski et al. | |
| 5,676,791 A | 10/1997 | Christel | |
| 5,683,036 A | 11/1997 | Benecke et al. | |
| 5,747,107 A * | 5/1998 | Bayer, Jr. et al. | 427/208.4 |
| 5,827,252 A | 10/1998 | Werenicz et al. | |
| 5,859,152 A | 1/1999 | Miller et al. | |
| 6,007,902 A | 12/1999 | Adur et al. | |
| 6,120,887 A | 9/2000 | Werenicz et al. | |
| 6,197,419 B1 * | 3/2001 | Hyde et al. | 428/354 |

FOREIGN PATENT DOCUMENTS

| | | | |
|---|---|---|---|
| DE | 25 02 878 | 7/1976 | |
| DE | 124 170 | 2/1977 | |
| DE | 221 128 A1 | 4/1985 | |
| DE | 38 36 434 A1 | 2/1990 | |
| DE | 299 282 A5 | 4/1992 | |
| DE | 195 34 704 A1 | 3/1997 | |
| EP | 0 107 076 A2 | 5/1984 | |
| EP | 0 067 060 B1 | 3/1986 | |
| EP | 0 189 911 A2 | 8/1986 | |
| EP | 0 295 694 A2 | 12/1988 | |
| EP | 0 295 694 A3 | 12/1988 | |
| EP | 0 315 013 A2 | 5/1989 | |
| EP | 0 187 728 B1 | 10/1989 | |
| EP | 0 395 381 A3 | 10/1990 | |
| EP | 0 185 337 B1 | 3/1991 | |
| EP | 0 476 636 A1 | 3/1992 | |
| EP | 0 508 485 A1 | 10/1992 | |
| EP | 0 255 238 B1 | 12/1992 | |
| EP | 0 291 267 B1 | 12/1992 | |
| EP | 0 295 694 B1 | 1/1993 | |
| EP | 0 456 885 B1 | 2/1995 | |
| EP | 0 476 636 B1 | 6/1995 | |
| EP | 0 575 703 B1 | 4/1996 | |
| EP | 0 704 753 B1 | 2/1998 | |
| EP | 0 841 159 A2 | 5/1998 | |
| EP | 0 908 295 A2 | 4/1999 | |
| EP | 0 706 448 B1 | 7/1999 | |
| EP | 0 935 955 A1 | 8/1999 | |
| FR | 1473557 | 3/1967 | |
| FR | 1571760 | 6/1969 | |
| FR | 2230830 | 12/1974 | |
| FR | 2 583 338 | 12/1986 | |
| GB | 913289 | 12/1962 | |
| GB | 1008126 | 10/1965 | |
| GB | 1160190 | 7/1969 | |
| GB | 1175993 | 1/1970 | |
| GB | 1178621 | 1/1970 | |
| GB | 1181334 | 2/1970 | |
| GB | 1291841 | 10/1972 | |
| GB | 1353078 | 5/1974 | |
| GB | 1 493 511 | 11/1977 | |
| GB | 2 274 429 | 7/1994 | |
| GB | 2311249 | 9/1997 | |
| JP | 54-127988 | 10/1979 | |
| JP | 57-116627 | 7/1982 | |
| JP | 57193362 | 11/1982 | |
| JP | 61-127331 | 6/1986 | |
| JP | 61-177224 | 8/1986 | |
| JP | 63-072777 | 4/1988 | |
| JP | 02-241738 | 9/1990 | |
| JP | 03-061039 | 3/1991 | |
| JP | 04-041238 | 2/1992 | |
| JP | 04-209899 | 7/1992 | |
| JP | 06-064019 | 3/1994 | |
| JP | 06-064093 | 3/1994 | |
| JP | 06-091777 | 4/1994 | |
| JP | 06-285990 | 10/1994 | |
| JP | 06-285991 | 10/1994 | |
| JP | 06-293078 | 10/1994 | |
| JP | 06-320625 | 11/1994 | |
| JP | 06-328572 | 11/1994 | |
| JP | 06-345911 | 12/1994 | |
| JP | 07-011220 | 1/1995 | |
| JP | 07-032482 | 2/1995 | |
| JP | 96323930 | 3/1995 | |
| JP | 96322880 | 6/1995 | |
| JP | 09-250090 | 9/1997 | |
| JP | 09-277481 | 10/1997 | |
| JP | 11-091051 | 4/1999 | |
| WO | WO 93/13929 | 7/1993 | |
| WO | WO 95/13307 | 5/1995 | |
| WO | WO 96/25902 * | 8/1996 | A61F/13/15 |
| WO | WO 96/26697 | 9/1996 | |
| WO | WO 96/40480 * | 12/1996 | B29C/41/22 |
| WO | WO 97/15722 * | 5/1997 | D21H/23/52 |
| WO | WO 98/53992 | 12/1998 | |
| WO | WO 00/33975 | 6/2000 | |

* cited by examiner

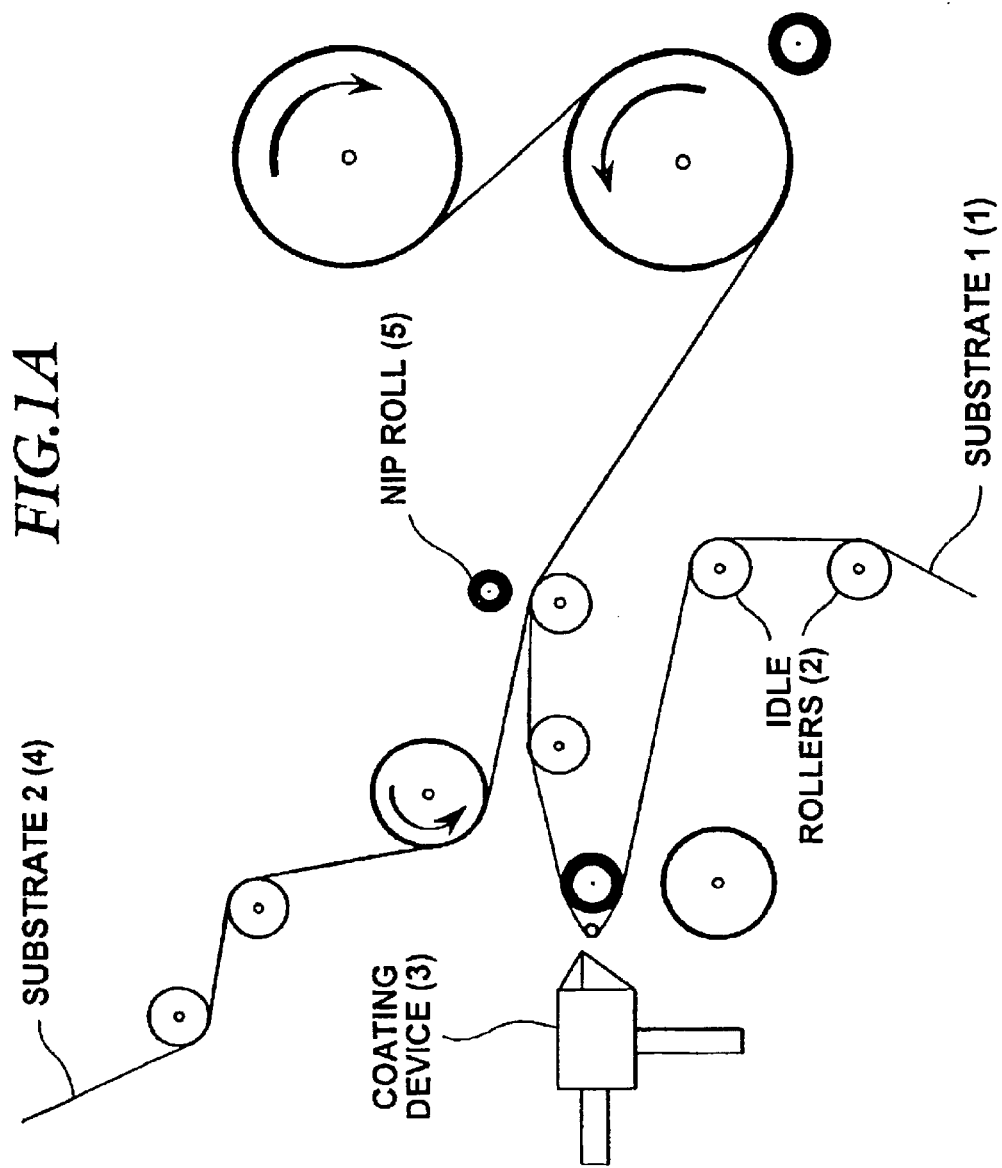

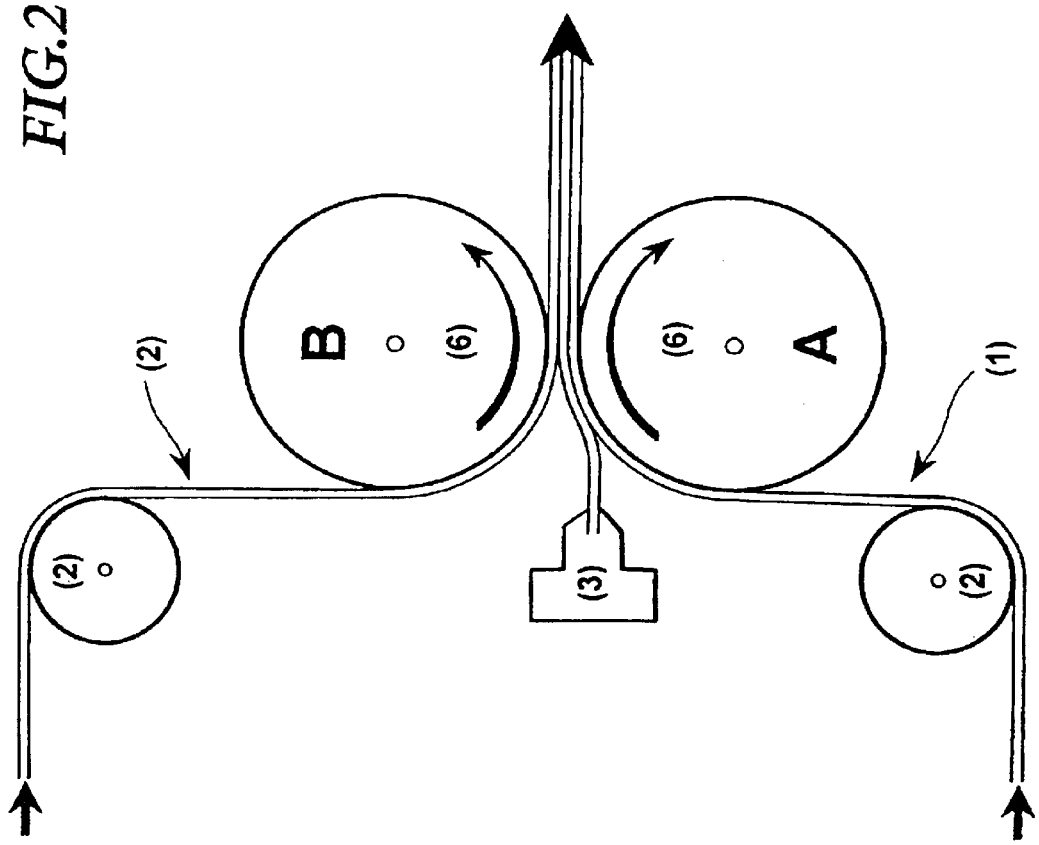

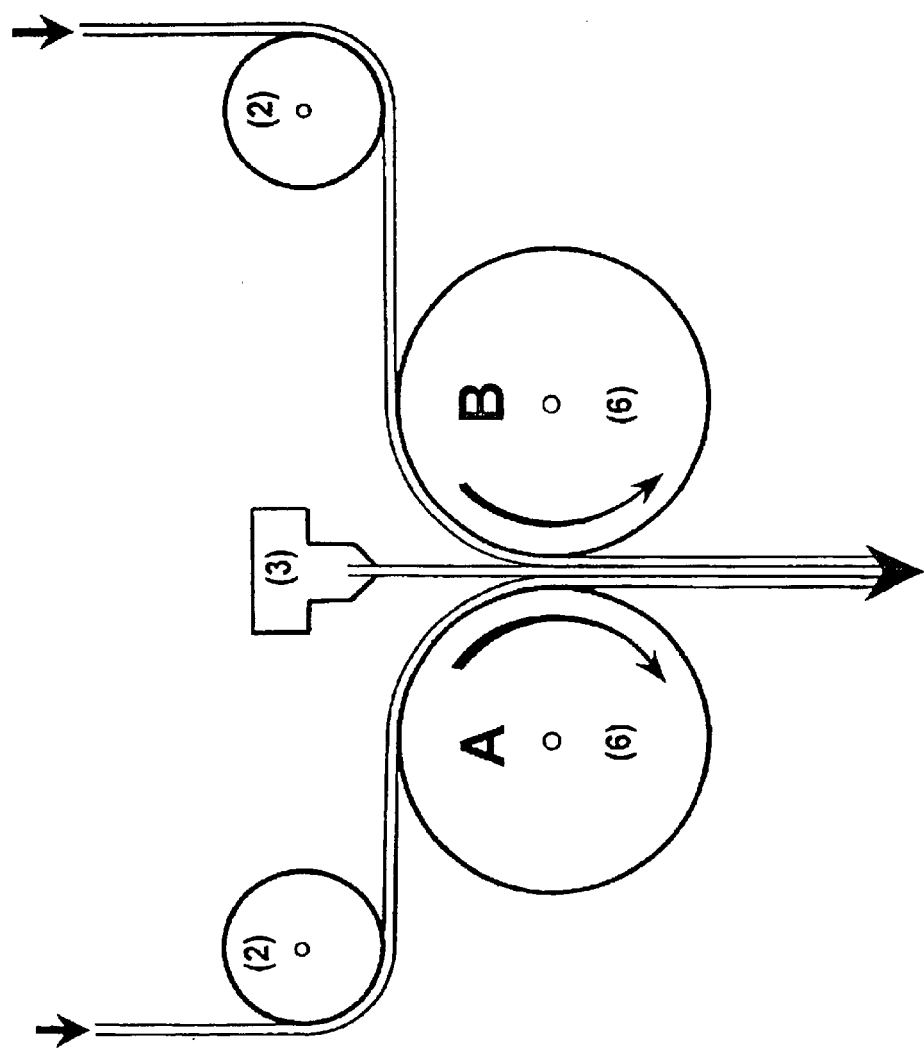

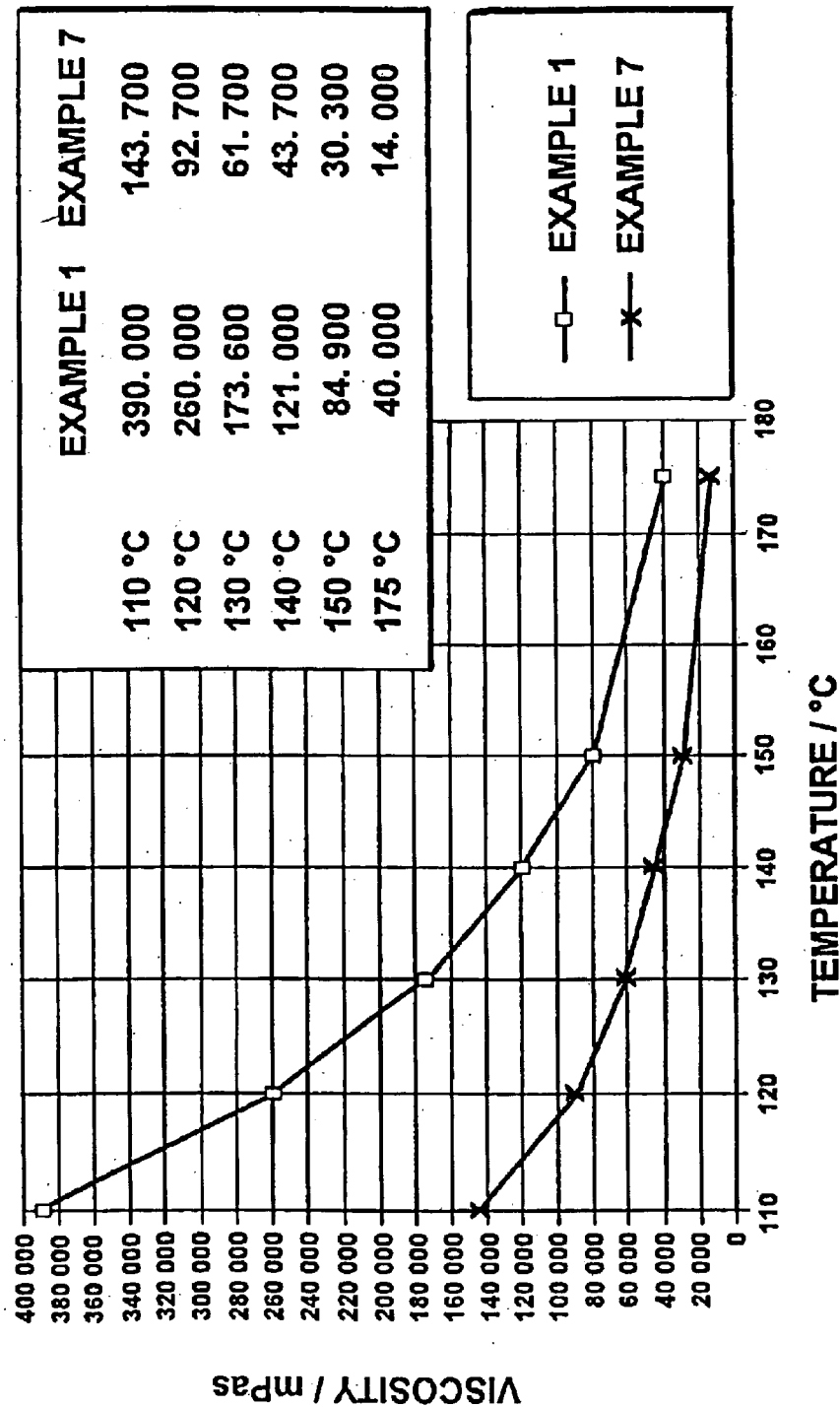

METHOD FOR PRODUCING A SUBSTANTIALLY CONTINUOUS, NONPOROUS THERMOPLASTIC COATING AND ARTICLES CONSTRUCTED THEREFROM

RELATED APPLICATIONS

This application is a continuation-in-part of PCT/EP98/01588 filed Mar. 18, 1998, which claims priority to DE 197 53 266.7, filed Dec. 1, 1997.

FIELD OF THE INVENTION

This invention relates to a non-contact coating method for producing a substantially continuous coating and articles constructed therefrom. The invention further relates to a non-contact slot coating method for producing a variety of coatings and laminations. This invention particularly relates to a method of coating a substrate including film, foil and paper with a molten thermoplastic composition which reduces streaking caused by particles and enables film-to-film, film-to-foil and film-to-paper or board laminations with nonreactive hot melt adhesives.

BACKGROUND OF THE INVENTION

Conventional slot nozzle coating of molten thermoplastic compositions onto substrates is typically done by keeping the slot nozzle in contact with the substrate such that the nozzle lies on the substrate during the coating. It is unproblematic to coat hot melt adhesives at low coating weights provided that the coating need not be completely closed, i.e. nonporous. In the context of this specification, "continuous" may be used to describe a completely closed, i.e. nonporous film or coating. If, however, a completely closed, i.e. nonporous coating is to be created, this can only be done using customary coating methods if the coating weight of the hot melt is substantially higher.

Such high coating weights are expensive. Furthermore, direct coating with a slot nozzle provides substantial mechanical and thermal stresses on the coated substrates, especially since the slot nozzle is heated during coating. Therefore, very sensitive substrates such as plastic films can not always be coated with a hot melt from a slot nozzle in a customary manner without damaging the substrate. Further, the high coating weights of this prior art lead to increased stiffness of the coated substrate.

WO 96/25902, published Aug. 29, 1996, assigned to the H.B. Fuller Co. in St. Paul, Minn. teaches a method of coating wherein certain thermoplastic compositions, are thermally made flowable and released from a coating device as a continuous coating without contact between the coating device and substrate being coated.

The present invention resides in specific adaptations to this novel coating method for use in a variety of other applications involving coatings on nonporous materials and coatings on porous materials. One type of such application is coatings on nonporous materials such as films. Thermoplastic compositions often contain unmelted particles either in the form of impurities such as contaminants and char or alternatively in the form of a particulate ingredient such as filler and additives. When these particles are of appreciable size and/or the slot nozzle has a relatively small gap, the particles tend to accumulate in the coating device interfering with the deposition of the coating. The particles block the passage of thermoplastic material causing a corresponding striation or streak to form on the substrate being coated. This problem is particularly prevalent in the formation of very thin coatings particularly when the optical quality is of importance such as for high quality graphic art applications, especially where films have to be coated. Accordingly, industry would find advantage in a coating method which rectifies these problems.

It is therefore an important object of this invention to provide a new coating method especially suited for coatings on films, foils, paper and other such materials, which makes it possible to avoid streaking and striation problems, especially at very low coating weights.

It is another important object of the ivention to provide a coating method which permits laminations and coatings to be carried out "inline" or "offline", using thin films, metallized foils, heat-sensitive materials and other sensitive substrates at reduced risk of obtaining faulty or flawed products.

It is yet another important object of the ivention to make film-to-film and film-to-foil laminations available which do not require the use of reactive adhesives.

Another object of the invention is to provide improved coating methods for coating thermoplastic compositions, especially hot melt adhesives, onto porous substrates such as textiles.

These and other objects and advantages of the invention will become more apparent from the following discussion.

SUMMARY OF THE INVENTION

The present invention is a method of coating a substrate with a thermoplastic composition employing a non-contact coating method and articles constructed therefrom. The method produces a substantially continuous coating. The method is useful for a variety of adhesive and coating applications and particularly those which employ conventional slot coating techniques, heat sensitive substrates, require low coating weights, and/or employ thermoplastic compositions comprising particles.

In one aspect, the present invention is a method of coating wherein a certain thermoplastic composition such as a hot melt adhesive which has been thermally made flowable, is released form a coating device onto a nonporous substrate as a substantially continuous coating without contact between said coating device and said substrate, and subsequently disposed upon the surface of the substrate.

In another aspect, the present invention is a method of coating wherein a certain thermoplastic composition such as a hot melt adhesive which has been thermally made flowable, is released form a coating device onto a substrate as a substantially continuous coating without contact between said coating device and said substrate, and subsequently disposed upon the surface of the substrate, wherein the distance between the coating device and the substrate is greater than 20 mm.

In another aspect, the present invention is a method of coating wherein a certain thermoplastic composition such as a hot melt adhesive, which has been thermally made flowable is provided in the form of a substantially continuous nonporous film without contact of the film with a substrate, and said film in then coated onto a substrate by means of either a release-coated roller in direct contact with the adhesive film, said roller nipping said adhesive and said substrate, or with a release coated second substrate being disposed upon the surface of the thermoplastic composition which is not in contact with the first substrate, or by a transfer-coating method, wherein a certain thermoplastic composition such as a hot melt adhesive which has been thermally made flowable, is released from a coating device e.g. onto a release coated roller as a substantially continuous coating, i.e. a nonporous film, without contact between said coating device and said roller, and subsequently disposed upon the surface of a substrate.

In another aspect, the present invention is a method of coating wherein a certain thermoplastic composition such as a hot melt adhesive which has been thermally made flowable, is released from a coating device onto a first substrate as a substantially continuous coating without contact between said coating device and first said substrate, and subsequently disposed upon the surface, wherein said coating is subsequently reheated and then contacted to a second substrate.

The invention further relates to utilizing this method for lamination, especially laminating of materials such as transparent film material, to a substrate, especially a printed paper or cardboard substrate as well as film to film and film to foil laminations, which avoids the above-mentioned disadvantages of the prior art and makes it possible to use nonreactive hot melt adhesives for such film-to-film and film-to-foil laminations.

For heat sensitive substrates, the thermoplastic composition is preferably coated at temperatures of less than about 160° C., even more preferably less than about 125° C., and most preferably less than about 110° C. to reduce the heat-induced stresses on the substrates being coated. Alternatively, the distance between the coating device and the substrate to be coated may be increased such that the molten thermoplastic composition has sufficiently cooled prior to contacting the heat sensitive substrate. This is particularly advantageous for coating and mutually bonding thermally sensitive substrates.

The thermoplastic composition preferably exhibits certain rheological characteristics such that the complex viscosity at high shear rates (1,000 rad/sec) is less than about 500 poise and the complex viscosity at low shear rates (1 rad/sec) is less than about 1,000 poise at the coating temperature. Some neat thermoplastic resins are suitable for the method of the present invention provided the uncompounded materials are sufficiently low enough in viscosity. However, compounded hot melt adhesives are preferred due to the ability to independently control the viscoelastic properties, open time, etc. Compounded hot melt are also advantageous to insure adequate adhesion to the carrier substrate or for delayed detackification of the coating after adherence to the substrate.

The resulting coating produced from said method is useful for a variety of applications wherein a consistent nonporous substantially continuous coating is desired. Coating weights of less than about 50–60 g/m$^2$ are preferred and even more preferred are coating weights of less than about 30 g/m$^2$ of the thermoplastic composition due to reduce expenditure and improved tactile quality of coated substrates. Coating weights of less than 10 g/m$^2$ can in many cases be achieved.

The resulting coating is preferable for producing laminations to paper or cardboard, especially to printed paper. The coating method is particularly advantageous for manufacturing as it employs fewer production steps than prior art coating methods. Improving productivity as well as reducing the coating weight mass per area results in coatings and corresponding articles that are less expensive than prior art.

The coating methods are however not restricted to applications involving nonporous substrates. The inventive coatings can also be used on porous substrates. Herein, various aspects of the invention can be employed, including a method where the thermoplastic composition is released from a coating device with the distance between the coating device and the substrate greater than 20 mm, and including the method of nipping a hot melt adhesive preformed film to a porous substrate by means of a release coated roller in direct contact with the adhesive film.

Articles as described herein comprise articles which have at least one first layer wherein said first layer is a nonporous substrate and at least one second layer wherein said second layer is a coating or adhesive layer produced from the coating methods described above.

BRIEF DESCRIPTION OF THE DRAWINGS

FIGS. 1-10 depict some of the preferred embodiments of the method of the present invention wherein a substantially continuous thermoplastic coating is formed and adhered to a substrate.

More specifically, FIG. 1A shows the basic structure of a coating and laminating machine useful for operating the invention;

FIGS. 6-10 illustrate laminations, including adhesive reactivation laminations, in accordance with the invention.

FIG. 11 is a plot of viscosity in units of mPas versus temperature in units of ° C. for Examples 1 and 7.

DETAILED DESCRIPTION OF THE INVENTION

In the method of the present invention, a molten thermoplastic composition, such as a hot melt adhesive, preferably substantially air-free, is initially provided in the form of a substantially continuous, nonporous "film" which is only later contacted with a substrate, a transfer roller or some other kind of support. Generally, the composition is released from a coating or release device in such a way that it exits the device as a substantially continuous film. A typical coating device is a slot nozzle, as it has previously been used for coating in direct contact with substrates. Thus, hot melt coating devices which are already known can be employed in accordance with the method of the present invention in that the slot nozzle is lifted off the substrate and is adjusted to have a suitable distance from the substrate.

As the flowable molten adhesive or thermoplastic composition exits the coating device, it does not contact the substrate, but rather travels for a distance as a continuous film suspended between the coating device and the substrate. The coating device may be initially contacted to the substrate in order to anchor of adhere the thermoplastic composition to the substrate provided that substrate will not be thermally or mechanically damaged by the contact with the coating device. Alternatively, the thermoplastic composition exits through the nozzle as a substantially continuous film and descends until contacting the substrate. The leading edge of the advancing substantially continuous film of thermoplastic composition adheres or anchors to the substrate upon contact with the substrate. In the case of heat sensitive materials, it is advantageous to advance the substrate by means of the drive rolls prior to contacting the thermoplastic composition to the substrate to avoid a build up of molten material which will melt through the substrate.

Figure 1B:
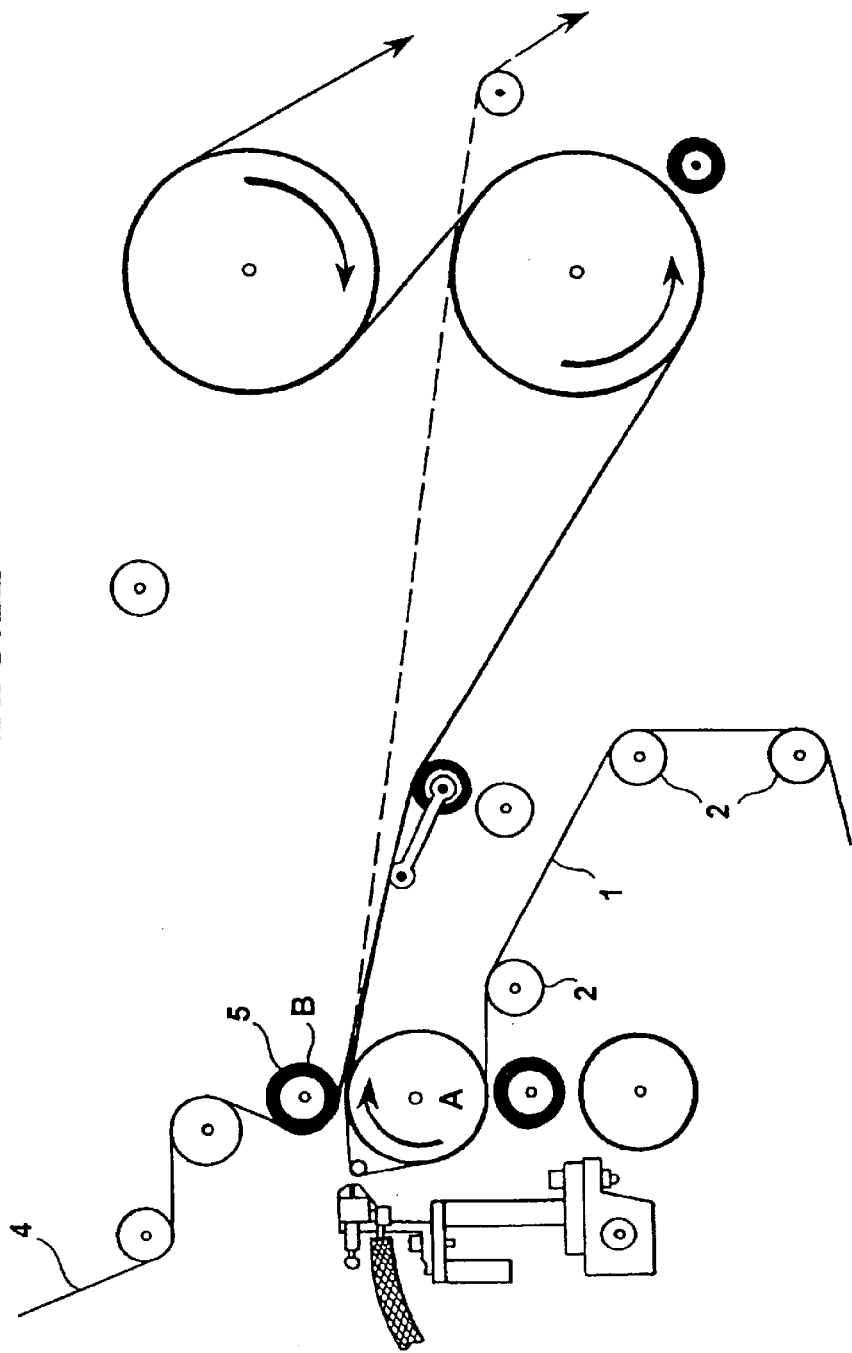
FIGS. 1B and 1C show the basic structures of similar such machines; positions of the coating device.
Figure 1C:
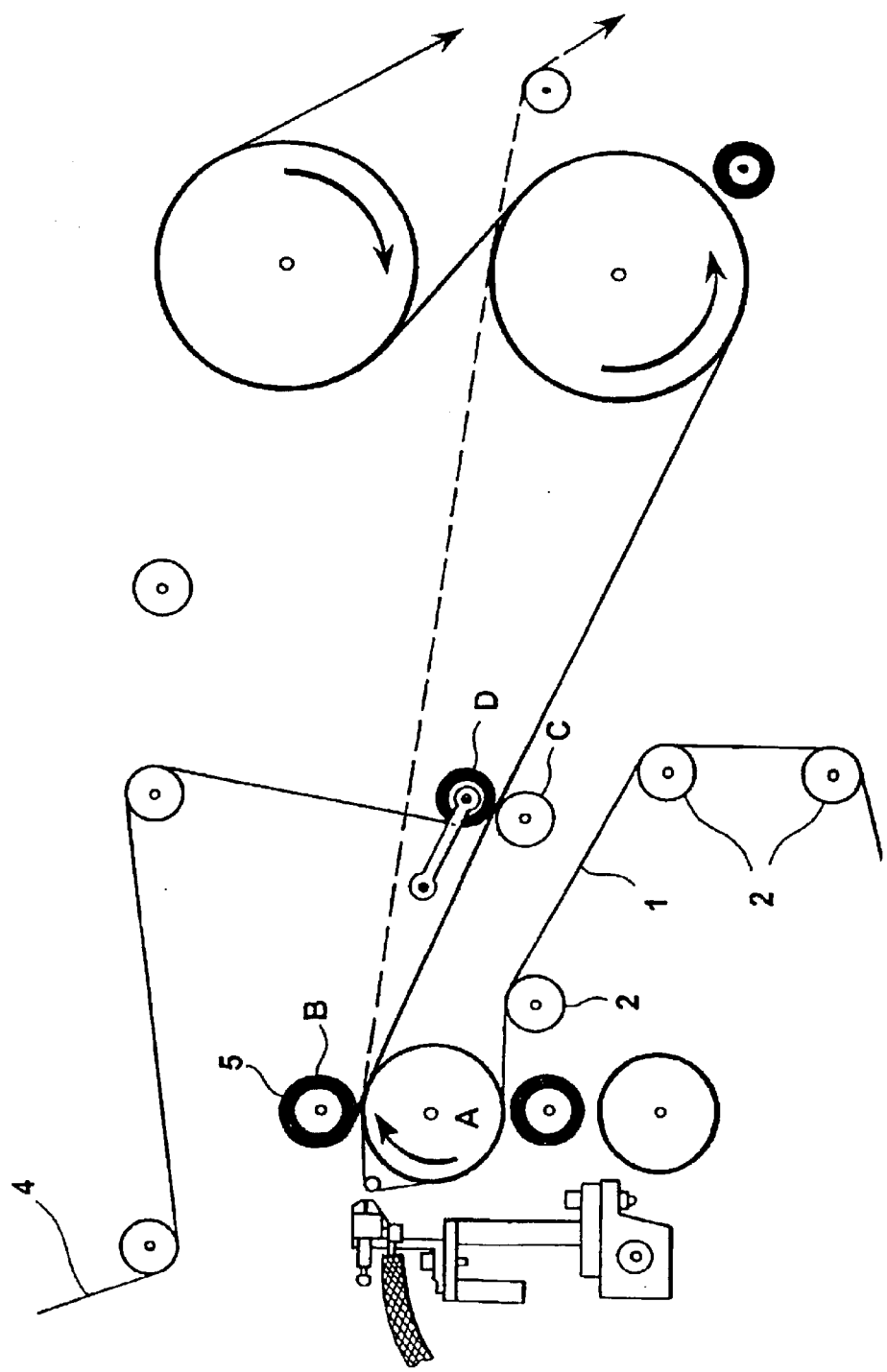

Machinery suitable for operating the inventive methods is shown schematically in FIGS. 1A, 1B and 1C. FIGS. 1A and 1B show an embodiment where a thermoplastic composition is released from a coating device (3) onto a first substrate (1), and a second substrate (4) is then disposed upon the free surface of the coated adhesive, by a nip roll (5). It is to be understood that this arrangement can be modified in other embodiments and especially that the second substrate (4) need not be used in all cases. Then, the nip roll (5) can be employed to nip the thermoplastic composition directly to the first substrate. For such embodiments, the nip roll (5) will be release-coated, e.g. may be a steel roller with a polytetrafluorethylene surface layer.

More specifically shown in FIGS. 1A and 1B, Substrate 1 (1) travels past a series of idle rollers (2) to ensure the web is in proper alignment prior to approaching the coating device (3). Substrate 2 (4) is optionally adhered to the coating surface by means of a nip roll (5). Substrate 1 is defined as the first substrate that is contacted with the substantially contiguous thermoplastic film. Substrate 1 may be any substrate which is generally provided in a roll good such as nonwoven, paper including release-coated paper, and a wide variety of films, foils and other materials. The embodiment of FIG. 1A, where the nip roll (5) is located fairly remote from the contact point of adhesive film and first substrate, is especially suited for the coating of porous substrates. The embodiment of FIG. 1B is especially suitable when Substrate 1 is nonporous meaning air does not readily pass through the substrate. In the case of film lamination, Substrate 1 is typically a film. Substrate 2 may also be provided in a roll good and be the same or a different material as Substrate 1. However, Substrate 2 may also be a particulate substance such as superabsorbent polymer, or a release-coated web material that can be pulled off the adhesive coating.

FIG. 1C shows an embodiment where the adhesive film is first nipped onto the first substrate (1) by nipp roll (5), which is part of a nipping station as later shown by rolls A and B in FIGS. 2-10.

A second substrate 4 is then disposed on the free surface not in contact with the first substrate (1), at a lamination station formed by folls C and D.

FIGS. 2-10 illustrate various preferred embodiments of the present invention wherein an extruded thermoplastic composition such as a hot melt adhesive is applied to a first substrate and then laminated to a second substrate. In each of these illustrations, Substrate 2 is optional in that the invention in its broadest aspect is simply a single continuous nonporous film formed from a non-contact coating method and coated onto a single substrate. In the absence of the second substrate, FIG. 5B represents a transfer coat application since the molten composition is first applied to a release coated roller which then contacts a first substrate at the nip.

Figure 6:
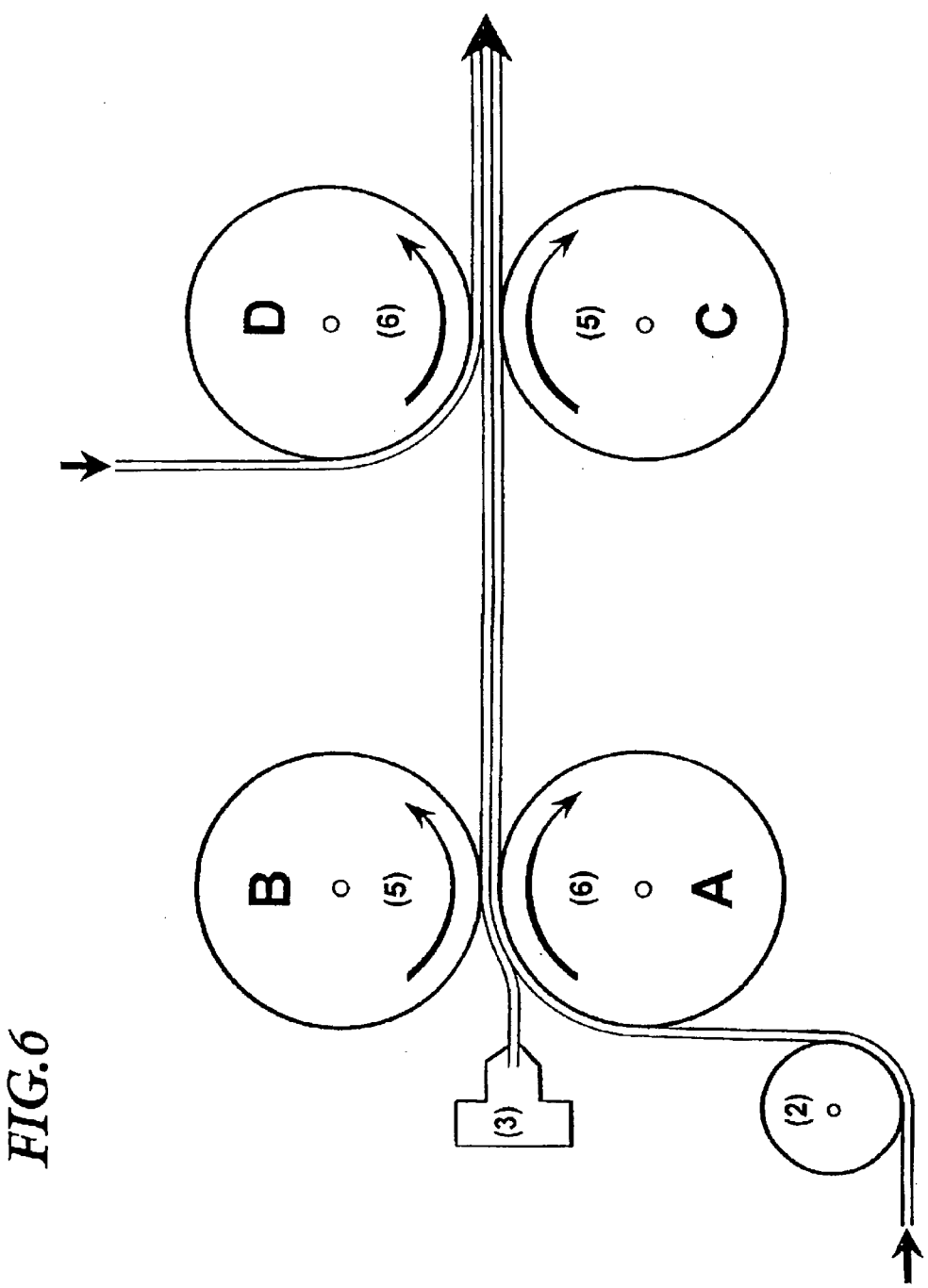
Figure 7:
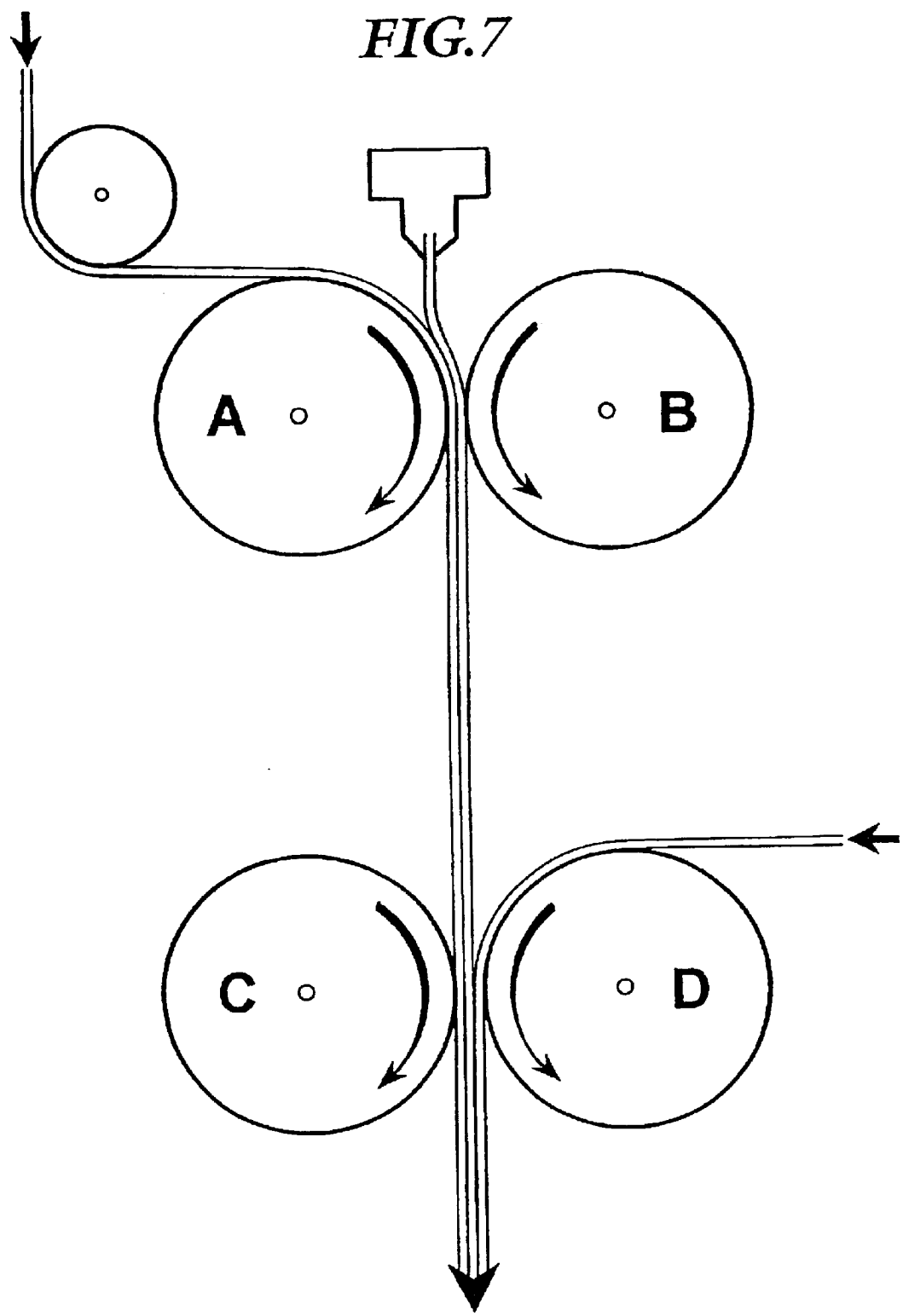

In embodiments where the thermoplastic coating or hot melt adhesive is contacted to a first substrate in the absence of a second substrate, as illustrated in FIGS. 6 and 7, or in the case when the second substrate is porous, it is important to have a release coating such as silicon, Teflon, or release paper on the roller(s) in contact with the adhesive or porous substrate to prevent adherence of the thermoplastic composition to the roller. The nip roller presses the air out from between the thermoplastic coating film and the substrate to insure there is no air entrapment between the first substrate and the thermoplastic composition. Roller A can be a steel cylinder to encourage heat transfer whereas roller B, typically the nip roller is rubber. In some cases it can be more preferred that roller A is rubber whereas roller B is a steel cylinder with an external release-coating.

FIGS. 3-10 demonstrate that the nozzle position may be varied from perpendicular positions to parallel positions with respect to the position of the substrate.

Figure 8:
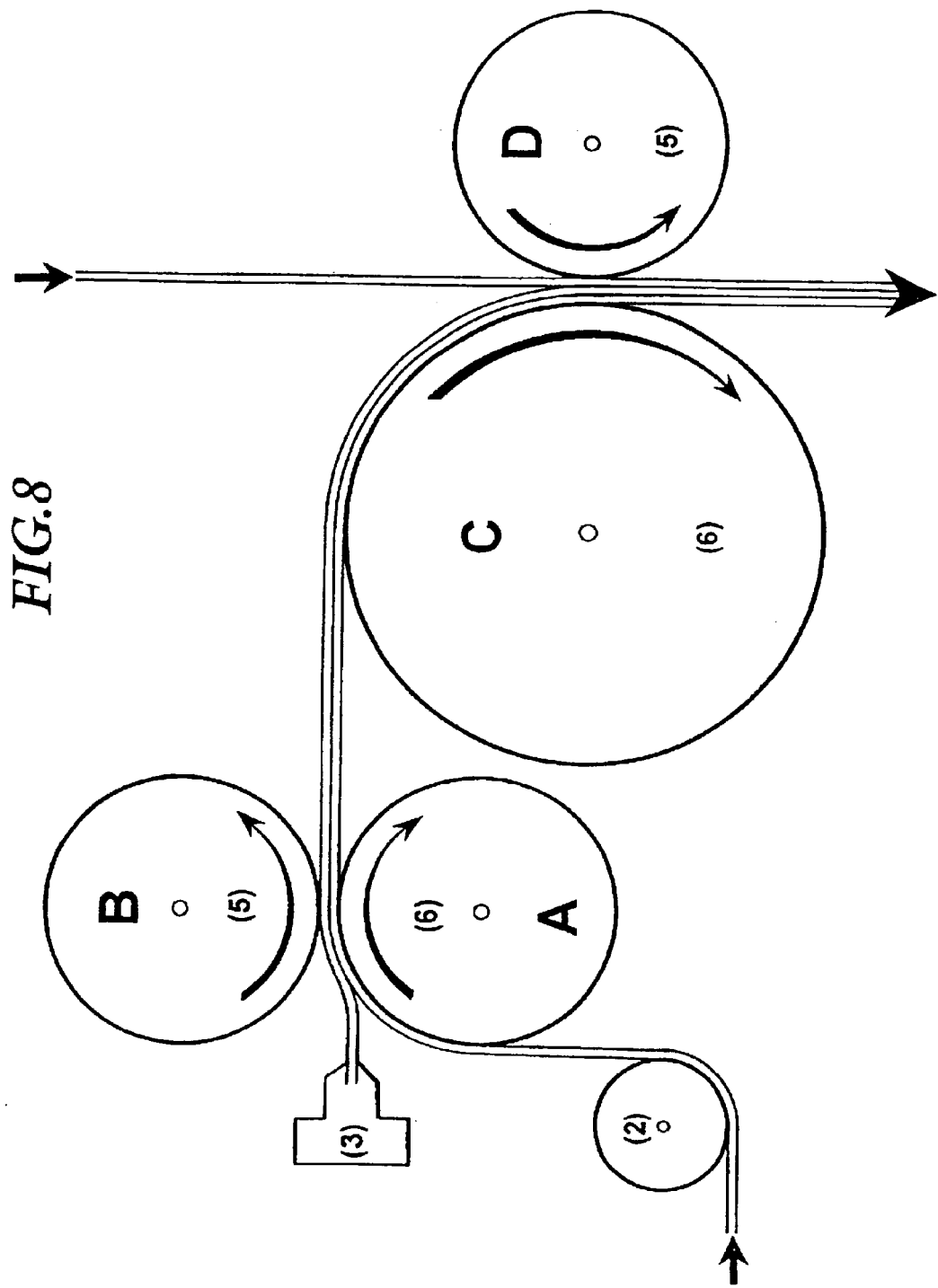
Figure 9:
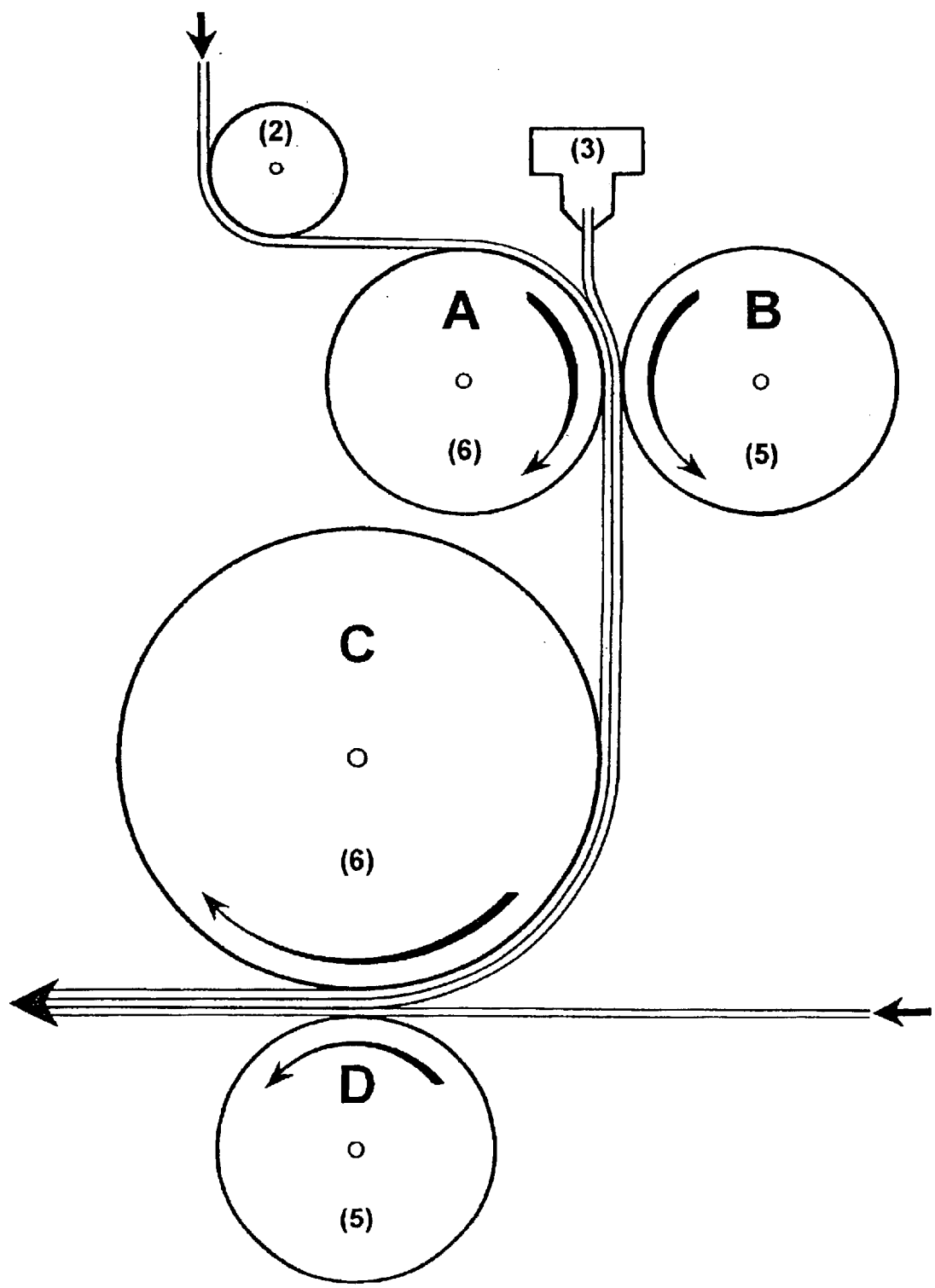
Figure 10:
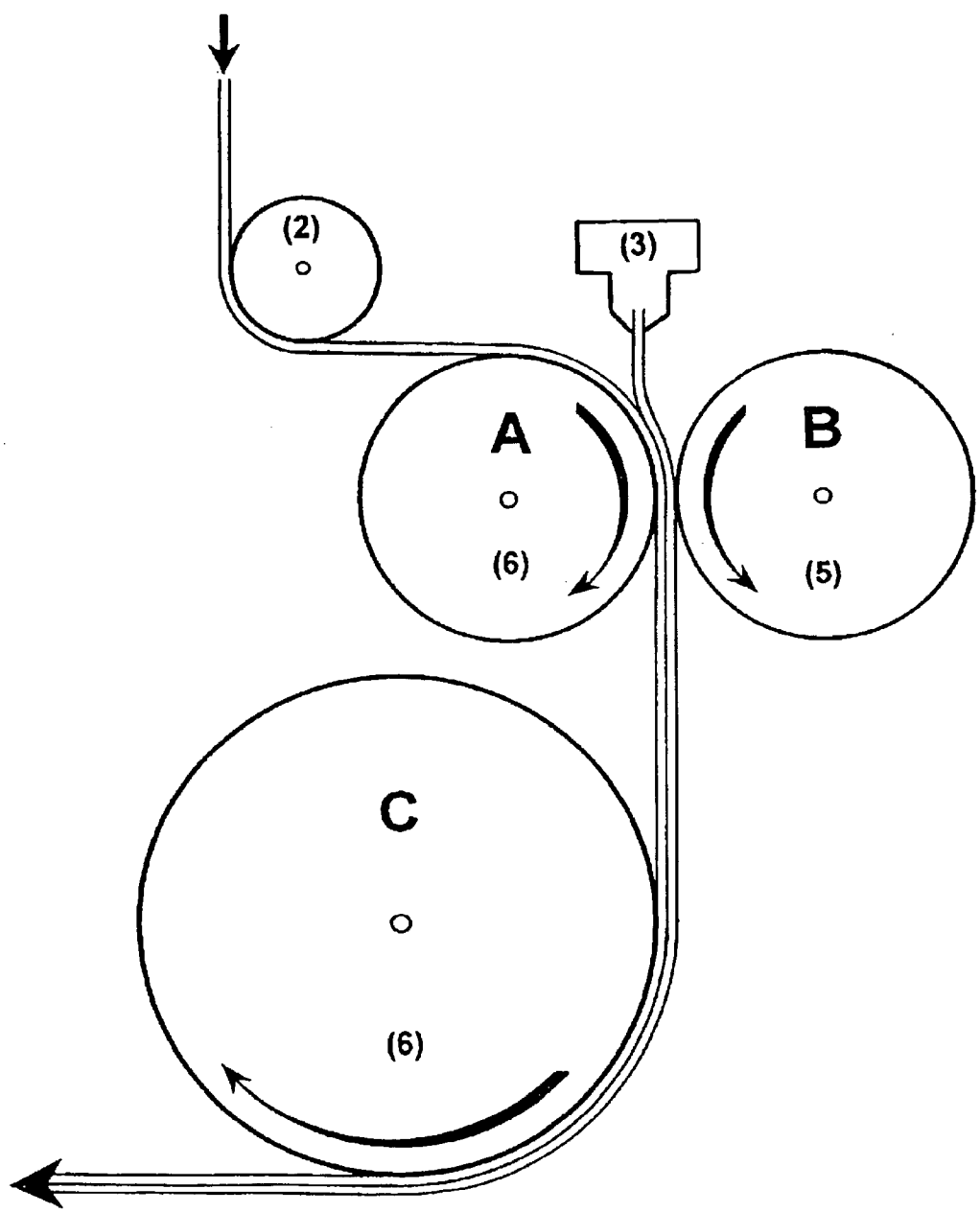

FIGS. 8 and 9 illustrate a second substrate being laminated to the first substrate at a position farther from the coating device. In this embodiment, it is preferred that roller C be heated to reactivate or extend the open time of the hot melt adhesive or thermoplastic coating prior to being laminated to the second substrate. The temperature of roller C can vary between about 30–100° C. for lamination between rollers C and D. Alternatively, roller C may be a chill roll to hasten the speed of set of the thermoplastic coating or hot melt adhesive. This can be useful where the laminate is produced for intermediate storage. The substrate laminated in the nip of rollers can be either in web form, or in the form of sheets. As shown in FIG. 10, where roller C is a chill roll, the inventive method can be used to produce substrates such as films coated on one side with a thermoplastic composition, which can e.g. be used for heat sealing applications. Where this is desired, a further layer of a release paper can of course be added, as shown in FIG. 9, to protect the heat-sealing material e.g. for intermediate storage.

Figure 5A:
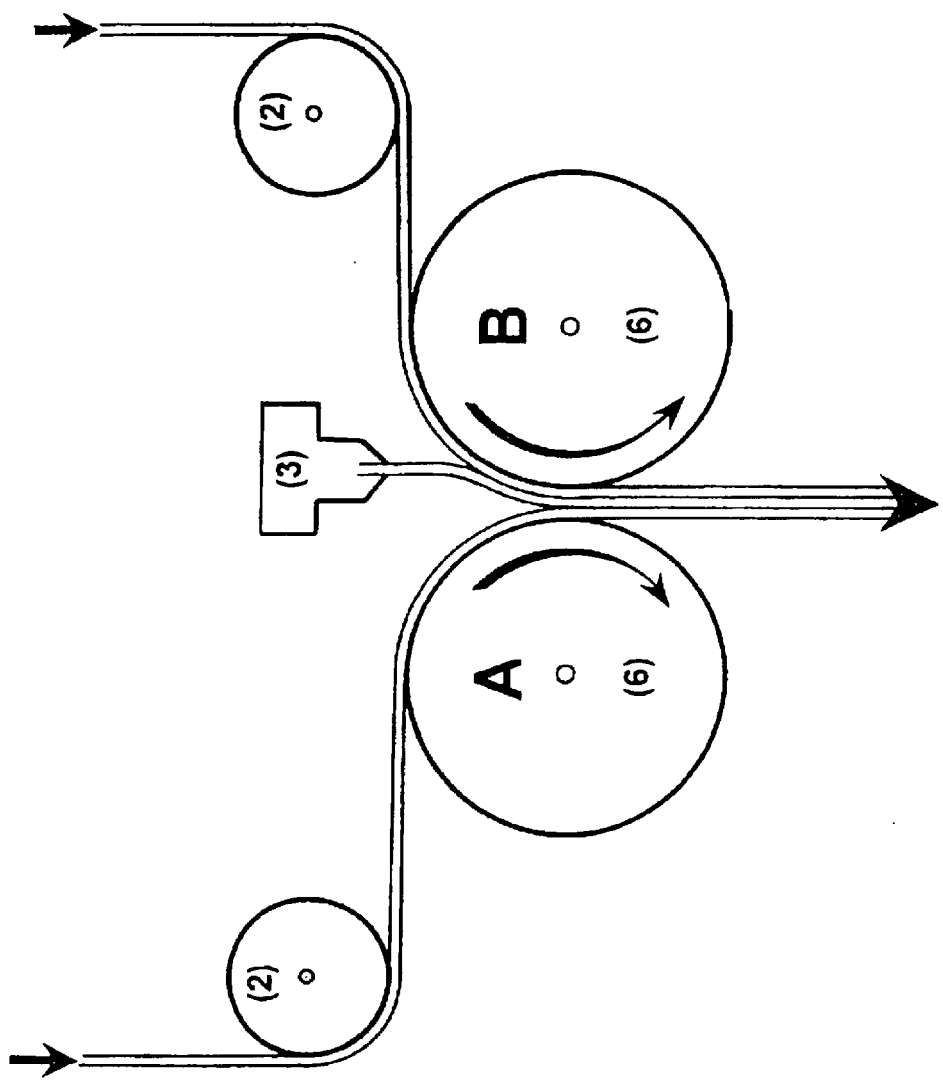
FIGS. 5A and B illustrate a lamination and a transfer-coating method according to the invention.
Figure 5B:
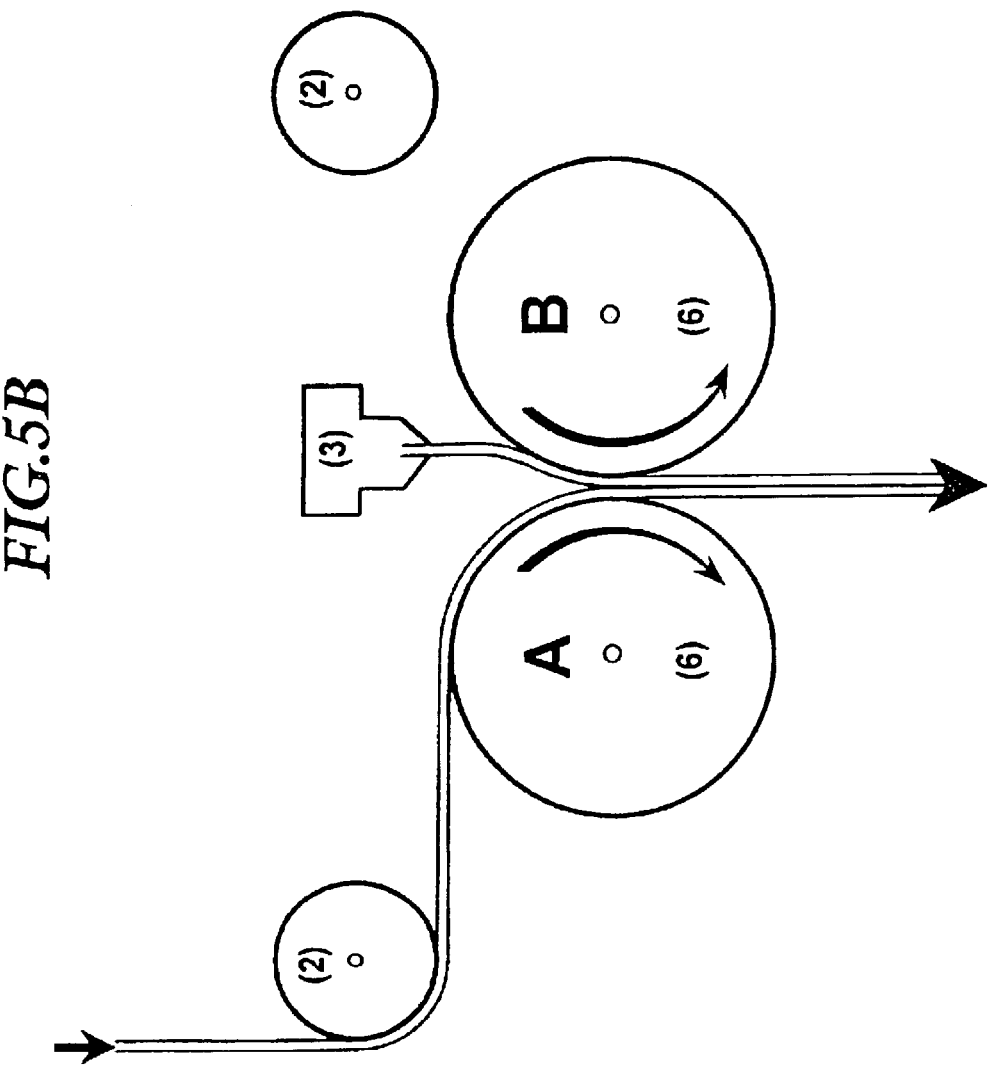

The coating device is positioned at a distance of at least 0.5 mm, preferably at least 2 mm, from the substrate (or the release coated roller in the case of transfer coating in the absence of a second substrate—FIG. 5B). The maximum distance the coating device may be positioned from the substrate is only limited by practicality, particularly when the coating device is positioned substantially vertically. Preferably, the distance is less than about 5 m, preferably less than about 3 m, more preferably less than about 1 m, even more preferably less than about 500 mm, and most preferably from about 2 to 20 mm, depending on the properties of the thermoplastic composition being coating. It is typically advantageous that the area between the coating device and substrate be shielded during coating from airborne contaminants and air currents to prevent distortion of the coating prior to contacting the substrate.

This is particularly the case when the distance between the coating device and substrate is greater than about 500 mm.

The distance is largely dictated by the viscosity and open time of the thermoplastic composition being coated. In the case of producing barrier films in this manner, it is surmised that the thermoplastic composition cools sufficiently in its suspended state such that it has built in viscosity and cohesive strength to the extent that any filaments or fibers present on the substrate surface cannot penetrate the coating, yet the thermoplastic composition is molten enough to adequately adhere to the substrate. The greater the distance between the coating device and the nip roller, the more the hot melt adhesive or coating will cool prior to contacting the first substrate. For some adhesive compositions, this cooling will adversely affect the adhesion (or anchorage) to the substrate. Therefore,the substrate may be passed over a heated roller prior to being nipped, or a heated nip roller may be employed if the distance between the nip roller and the coating device causes the coating or adhesive to cool to the extent that it will no longer adequately adhere or anchor to the substrate.

Figure 3:
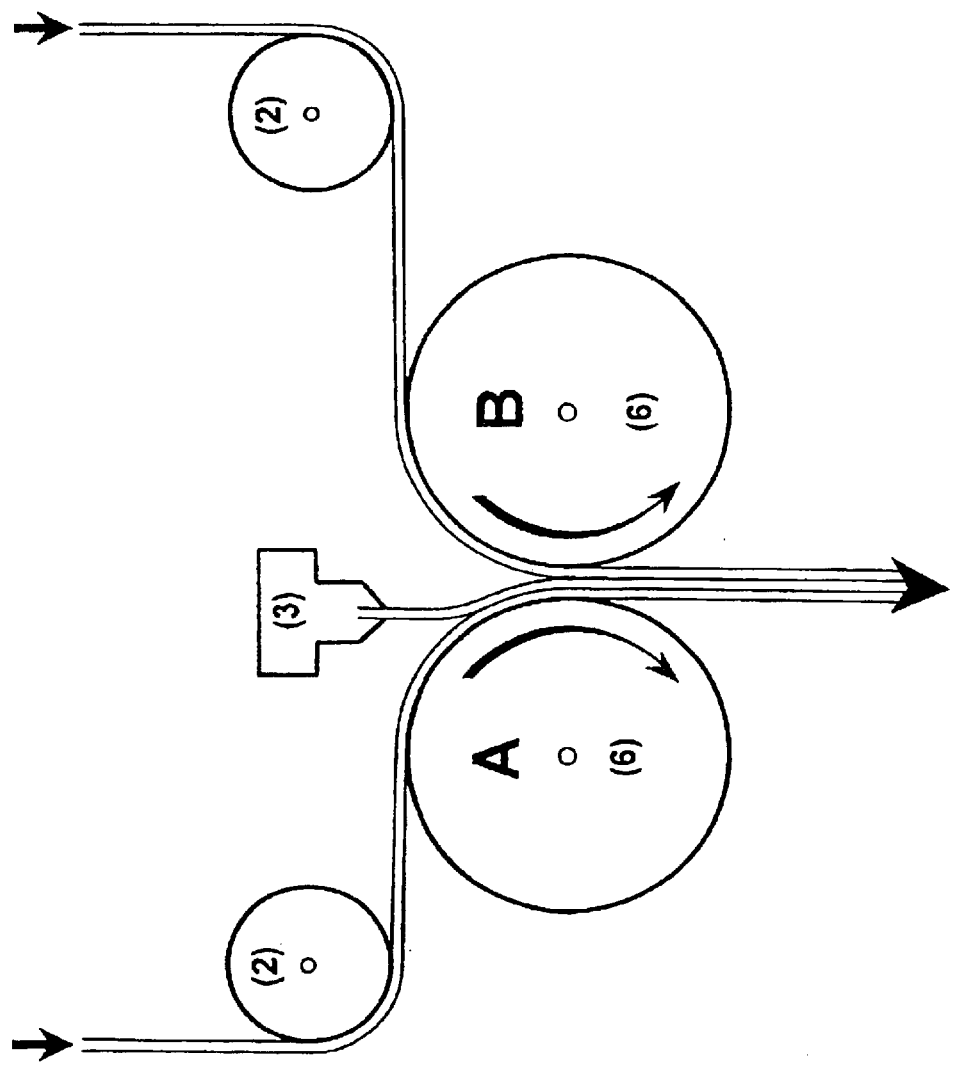

The coating may contact the substrate at any angle (compare e.g. FIGS. 3 and 4). However, it has been shown to be especially advantageous for some applications such as for barrier films, that the coating later contacts the substrate in a substantially horizontal direction as in FIGS. 1A, 1B, 2, 6 and B. To accomplish this, a roller can be provided in the path of movement of the substrate to give the substrate a substantially vertical, upward direction, as the substrate passes the coating device. Additionally, the coating device, such as a slot nozzle, can be provided substantially horizontally beside the roller so that the coating travels from the side towards the surface of the substrate.

The diameter of the coating rolle is preferably about 15 mm to about 50 mm in diameter with the nozzle slightly above the center of the coating roll such that the angle at which the thermoplastic coating contacts the substrate is less than about 60° as the substrate is moving away from the nozzle. The coating head is adjusted by one of ordinary skill in the art to optimize for even flow and distribution of the thermoplastic coating over the entire width of the application.

Thereafter, tho sufficiently cooled coating contacts the substrate surface and adheres to the surface without deeply penetrating into the substrate. If the thermoplastic coating is of such a composition that it substantially detackifies after sufficient cooling, the laminate of the coated substrate, thus formed, can be rolled up and stored. Alternatively this can be achieved by placing a release coated second substrate, such as a silicone-coated paper, on the surface of the adhesive coating. The laminate can then be used at some later time. The laminate can be bonded by any suitable bonding technique including ultrasonic bonding, heat sealing, or more commonly adhesive bonding.

Preferably, the coating is done "inline" immediately before any further processing. An example of an in-line process for which the invention is particularly well suited may be found in DE 195 46 272 C1 to Billhöfer maschinenfabrik GmbH, incorporated herein by reference. The surface of the coating layer which is pointing away from the substrate may be sufficiently tacky such that it can be used as a construction adhesive or for lamination to other substrates and therefore can also serve to bond the coated substrate to another substrate layer. Other substrates that may be simultaneously bonded or laminated in this manner include absorbent, superabsorbent polymer, elastomeric strands or webs, tissue, films, foils, paper, cardboard, metal, as well as various permeable coverstock materials such as nonwoven or perforated films. These materials may be in the form of roll-goods, sheets, or particles.

In a preferred embodiment, the substrate to be laminated is paper or cardboard, especially printed paper, processed photographic paper or printed cardboard, as used in the production of e.g. book covers, picture postcards, calendars, posters, high quality packaging materials, gift-wraps and so forth. The laminating material can be synthetic film material, paper, textile material or any other flexible laminating material suitable for lamination. Preferably, the laminating material is, however, a synthetic film material, especially a clear and transparent film material as is customarily used for such laminations.

Typically such film materials comprise plane or embossed films, which are at least substantially made from oriented polypropylene, polyethylene, polyesters such as Mylar®, polyacetate, nylon, celluloseacetate, and so forth having a thickness of about 5 microns to about 50 microns. These films are commonly laminated or sealed to printed paper or boardstock. Composite materials are commonly produced including film to film and film to foil and metallized substrates are commonly used for laminates. These types of laminates are commonly found in such industries as graphic arts and packaging. Using the method of the invention, such laminates can be produced using nonreactive hot melt adhesives instead of the commonly used reactive adhesives.

Generally, the exit temperature of the thermoplastic composition will be less than about 240° C., and thus much lower than typical polymer extrusion temperatures, which are of the order of 300° C. Although the temperature of the thermoplastic composition as it exits the coating device may range from about 80° C. and about 180° C. or more, the non-contact coating system of the present invention allows coating to be accomplished at extremely low temperatures. For this embodiment it is preferred that the thermoplastic composition be coated at a temperature less than 160° C., more preferably less than about 140° C., even more preferable less than about 120° C. and even more preferable less than about 110° C. As mentioned previously, heat sensitive materials can also be coated in this manner by employing higher coating temperatures in combination with increasing the distance between the coating device and the substrate to be coated to allow for sufficient cooling. Materials which are normally too sensitive mechanically and/or thermally (e.g. very low gauge films) for customary coating methods can therefore be coated using the method of the present invention. Such sensitive materials include low gauge polyethylene materials, low basis weight nonwovens and the like.

A substantial advantage of the present invention is that a substantially continuous coating layers can be made from hot melts at very low coating weights. Even with customary commercially available hot melts, continuous layers can be produced at coating weights ranging from about 0.5 $g/m^2$ to as much as 50–60 $g/m^2$, preferably at coating weights of not more than about 30 $g/m^2$, more preferably at coating weights of not more than 20 $g/m^2$, even more preferably between 10 $g/m^2$ and 20 $g/m^2$ and most preferably less than 10 $g/m^2$.

However, coating weights higher than 60 $g/m^2$ may be useful for other applications wherein reducing the mechanical and heat-induced stresses is of primary importance.

The very thin coatings which can be produced according to the invention not only contribute to the economical advantages of the inventive method, but also makes it possible to achieve a very much reduced stiffness of the material, which thus comes much closer, in its properties, to uncoated substrates.

The Thermoplastic Composition

As previously mentioned various thermoplastic materials may be used in the present invention such as various thermoplastic polymers may be used including polyethylene, polypropylene, copolymers of olefins, especially ethylene, and (meth-) acrylic acid; copolymers of olefins, especially ethylene, and (meth-) acrylic acid derivatives, especially (meth-) acrylic acid esters; copolymers of olefins, especially ethylene, and vinylic compounds, especially vinyl carboxylates such as vinyl acetate; thermoplastic rubbers (or synthetic rubbers) such as styrene-isoprene-styrene, styrene-butadiene-styrene, styrene-ethylene/butylene-styrene and styrene-ethylene/propylene-styreneblock copolymers available in commerce under the tradenames of Kraton®, Solprene®, and Stereon®; metallocene-catalyzed polymers, especially based on ethylene and/or propylene; polyolefins such as ethylene, polypropylene and amorphous polyolefins (atactic poly-alpha-olefins) such as Vestoplast® 703 (Hüls); polyesters; polyamides; ionomers and corresponding copolymers; and mixtures thereof. Such thermoplastic materials may be employed in the coating method of the present invention uncompounded provided the thermoplastic material is sufficiently low enough in viscosity. However, hot melt adhesives are preferred due to the ability to independently tailor the viscoelastic properties, open time, tack, and various other properties. Hot melt adhesives commonly have melt flow indices required for such processing already at very low temperatures. Typical hot melts are fluid enough for such processing at temperatures ranging from about 60° C. to about 175° C. Additionally, various known hot melt moisture cure compositions are contemplated for use in the present invention.

With suitable hot melts, such as those described in DE-A-41 21 716, it is also possible to make materials which are impermeable to liquid water, yet water vapor permeable rendering the coating "breathable".

In addition to commonly known hot melt adhesives, thermoplastic compositions comprising a water soluble, saline (body fluid) insoluble polymer such as Eastman AQ copolyesters, commercially available from Eastman, are also particularly useful for creating barrier films that are impervious to body fluid, yet readily water soluble. This feature is of particular interest for creating flushable and compostable disposable hygienic products. Furthermore, there may be applications wherein water permeability is desired. Accordingly, this coating method may also be suitable for coating water soluble and/or biodegradable thermoplastic materials.

In the case of the lamination adhesives for transparent substrates, thermoplastic polymers comprising substantially or consisting entirely of one or more ethylene/methylacrylate copolymers (EMA's) and/or ethylene/n-butyl acrylate copolymers (EnBA's) is preferred. EnBA copolymers are presently the most preferred such polymers.

More preferably, the thermoplastic composition exhibits certain rheological characteristics such that a substantially continuous coating can be produced at coating weights of less than about 50–60 g/m² and preferably less than about 30 g/m². In general, the rheological properties preferably fall within a rheological window wherein the complex viscosity at the coating temperature at high shear rates (1,000 rad/sec) is less than about 500 poise and the complex viscosity at low shear rates (<1 rad/sec) is less than about 1,000 poise. In other words, preferable thermoplastic compositions exhibit Newtonian regions at low shear rates and shear thinning at higher shear rates. Thermoplastic compositions having wide windows of application are those in which the composition exhibits the appropriate rheological properties at a variety of application settings, particularly low application temperatures. Narrow application windows are those in which the rheological parameters are only met under very specific conditions.

The applicants surmise the complex viscosity and high shear relates to the processing conditions at the slot die exit. A composition with too high of a complex viscosity at 1,000 radians/sec would require excessive pump pressure to exit the coating device. A die with a shim gap larger than 3 mm could be used to process these materials but a higher coating weight may result.

The complex viscosity and low shear relates to the settling of the coating on the substrate during the time it is suspended above the substrate. If the low shear value is too high, the coating may not adhere adequately to the substrate and/or the thermoplastic composition builds up at the nozzle causing a streaked, discontinuous coating. If the low shear viscosity is too low, the coating may seep into the substrate, causing poor barrier properties.

Extensional viscosity, which was not measured can also strongly influence the melt strength. Higher levels of branching or the addition of a small concentration of a high molecular weight material can strongly influence the melt strength. More preferred, are compositions that meet the target rheological parameters at low application temperatures, less than about 177° C., preferably less than about 160° C., more preferably less than about 140° C., even more preferably lest than about 125° C., most preferably less than about 110° C.

Accordingly, many known hot melt adhesive compositions are well suited for use in the coating method of this invention. Hot melt adhesives typically comprise at least one thermoplastic polymer, at least one plasticizer and at least one tackifying resin. Preferably, such suitable hot melts comprise up to 50% by weight of thermoplastic polymer, up to 40% by weight of a plasticizer and up to 70% by weight of tackifying resin. In the case of hot melt adhesives which are not pressure sensitive, wax is generally employed in concentrations up to about 30% by weight of the adhesive.

Generally, the invention's hot melts will additionally contain one or more tackifying resins, plasticizers or oils and waxes plus customary additives and adjutants such as stabilizers, antioxidants, pigments, UV stabilizers or absorbers, fillers etc. Plasticizers and tackifying resins used in hot melt adhesives are known.

Oils such as naphthenic oils are preferred plasticizers. As for tackifying resins, those resins already known for such purposes are generally suitable, especially aliphatic, cycloaliphatic and/or aromatic hydrocarbon resins, ester resins and other such compatible resins. It is presently preferred to use either aliphatic or aromatic modified hydrocarbons resin. The preferred aliphatic resins are hydrogenated aliphatic hydrocarbon resin, for example, the Escorez® 5000 series available from the Exxon Chemical Co. in Houston, Tex. and the Arkon® P and M series available from Arakawa Chemical Co. and the Regalite® series available from Hercules Inc. in Wilmington, Del. Rosins and rosin ester resins are also useful in the present invention. One such hydrogenated rosin acid tackifying resin is Foral® AX available from Hercules. Modified hydrocarbon resins such as modified terpenes including styrenated terpenes such as the Zonatac® series available from Arizona Chemical Co. in Panama City, Fla. and the Kristalex® series of alpha-methyl styrene resins available from Hercules, Inc. and the Uratack® series available from Arizona Chemical are also useful in the present invention. The components are mixed and processed in a known manner to prepare the hot melts which can be used according to this invention.

Waxes are also useful in the present invention. These include synthetic high melting point waxes such as Fischer Tropuch waxes available from Sasol (South Africa) under the tradename of Paraflint®, or from Shell Malaysia under the tradename Petrolite, and high density low molecular weight polyethylene waxes available from Marcus Chemical Co. under the tradename of Marcus®. AC 8 is another useful polyethylene wax available from Allied Chemical. Microcrystalline waxes and paraffin waxes are also useful to the present invention.

Laminating adhesives will preferably comprise up to 100% of at least one thermoplastic polymer described above; 0–50% of an aliphatic hydrocarbon resin; 0–20% of an aromatic hydrocarbon resin; 0–40% rosin and 0–20% wax, said components and their amounts being chosen so that the adhesive is in-line coatable onto a laminating material and/or a laminating substrate, for subsequent in-line lamination of said laminating material to said substrate.

More preferably, in the case of film laminating, the adhesive will comprise the following components: up to 100% of at least one EMA and/or EnBA copolymer; 0–50% hydrogenated aliphatic hydrocarbon resin; 0–20% alpha-methyl styrene resin; 0–40% hydrogenated rosin and 0–20% polyethylene wax.

The hot melt adhesive usable for practicing the invention's method can, in the simplest case, consist substantially or even completely of one or more grades of EMA or EnBA copolymers. EMA and EnBA copolymers are available from Elf Atochem under the Lotryl® tradename, from Quantum Chemical Co. and From Exxon Chemical Co. under the Optema® tradename. A variety of different grades of EMA and EnBA copolymers are available. They mainly differ in ester content, melt flow index (MFI) and melting point.

In presently preferred special embodiments, the hot melt adhesive essentially consists of 35–60% EnBA or EMA; 30–50% hydrogenated aliphatic hydrocarbon resin or about 10% alpha-methyl styrene resin; 0–30% hydrogenated rosin and 0–10% polyethylene wax, plus small amounts of stabilizer. In some preferred embodiments, the thermoplastic polymer of the hot melt adhesive is a single grade of EnBA copolymer, usually at the low end of the MFI range (i.e. MFI less than 10 g/10 min.) In other preferred embodiments, the thermoplastic polymer comprises more than one grade of EnBA, and in these cases, two or three different grades wherein at least two of the grades preferably have MFI's which differ by at least a factor of 4 and up to a factor of 10 (i.e. one grade has an MFI more than 4 times that of the other grade.

The inventive hot melts can be used at application temperatures (or processing temperatures) which are low enough to prevent distortion of heat sensitive plastic film, and at the same time show excellent flow properties at such low temperature. It is, for example, possible to coat and laminate the inventive hot melt on the laminating materials. Non-contact coating is especially advantageous for heat sensitive films. Excellent film forming performance is achieved, and the laminated products exhibits high glossiness.

The laminating adhesives of the invention produce high transparency of the hot melt coating, so that high gloss is achieved, while readability and color rendition of, for example, printing on the substrate is not impaired.

The inventive hot melts show excellent (high) hot-tack and open time characteristics for the method of the present invention as well as setting properties. They meet the requirements of machine condition, in-line embossing and cutting, for example, in the graphic arts industry.

Laminates made according to the invention exhibit high heat resistance and high UV resistance, and correspondingly little delamination or yellowing. Also after heat forming and embossing, no delamination is observed when the hot melt formulations of the invention are used.

The following non-limiting examples further assist in illustrating the present invention.

EXAMPLES

Hot melt adhesives were produced from different thermoplastic polymers, tackifiers and plastizisers as shown in Table 1 below:

TABLE I

Examples 1–8

| Ingredients | Ex 1 | Ex 2 | Ex 3 | Ex 4 | Ex 5 | Ex 6 | Ex 7 | Ex 8 |
|---|---|---|---|---|---|---|---|---|
| Lotryl® 17 BA 07 EnBA copolymer | 23 | 40 | 35 | 10 | 23 | — | — | — |
| Lotryl® 35 BA 40 EnBA copolymer | 15 | — | — | 20 | 15 | 20 | 15 | 15 |
| Lotryl® 35 BA 320 EnBA copolymer | 17 | — | — | 30 | 17 | 10 | 16 | 15 |
| Escorene®, UL 150–19 EVA copolymer | — | — | — | — | — | 20 | 24 | 23 |
| AC-8 polyethylene wax | 5 | 10 | — | — | 5 | — | 5 | — |
| Paraflint® C 80 polyethyl n wax | — | — | — | — | — | 10 | — | — |
| Mobil Wax 145 paraffin wax | — | — | — | — | — | — | — | 5 |
| Escorez® 5300 hydrocarbon resin | 28 | 38 | 38 | 38 | — | 23 | 28 | 30 |
| Foral® AX rosin acid resin | 10 | 10 | 25 | — | 28 | 15 | 10 | 10 |
| Kristalex® F 85 alpha-methyl styrene resin | — | — | — | — | 10 | — | — | — |

Hot melt adhesives corresponding to the compositions depicted in Examples 1 and 7 were coated onto substrates, using a modified PAK 600 laminating machine by Kroenert, Hamburg, Germany. The structure of this machine is basically similar to that shown in FIG. 1B. With this type of machine, it is possible to nip the adhesive film directly onto the first substrate (1) by means of nip roller (5) or nip a second substrate (4) onto the first substrate and adhesive, again by means of nip roller (5). In the tests, both methods were tried. The dispensing temperature of the hot melt was 140° C. for the composition of Example 1, and 110° C. for the composition of Example 7. These compositions show favourable low viscosities, as is notable from the attached FIG. 11. This figure illustrates the viscosities of Examples 1 and 7.

Coatings were made on polyester film (Polyester RN 36, produced by Pütz Folien, Taunusstein-Wehen, Germany) and high density polyethylene films (HDPE KC 3664.00, obtained from Mildenberger+Willing, Gronau, Germany).

As a second substrate (where used), these films were also used. In other experiments, silicone paper was used instead. Tests were also made with printing paper sheets as the second substrate.

Coating weights were 5 to 6 g/m$^2$ at machine speeds of approximately 70 m/minute.

The adhesive film was released from the coating slot nozzle, at various distances from the first substrate (1) to be coated with the adhesive, in a variety of tests. In another set of experiments, with a vertical configuration (similar to FIGS. 3-5, 7, 9 and 10) it was found that the distance of the slot nozzle from the substrate could be varied between a few millimeters and up to 500 mm and more, without materially affecting the quality of the coating.

Wherein these experiments, the adhesive film released from the coating slot nozzle was directly coated onto the first substrate by means of nip roller (5) provided with a release coating, it was found that the adhesive did not adhere to the nip roller. The nip pressure was not measured, but the nip roller was pressed against the substrate at a laminating pressure of 7 to 8 bar.

It was found that the adhesive coated onto the first substrate left the nip station with no air enclosed between the adhesive and the first substrate.

In other tests, a second substrate was laminated onto the adhesive layer by a second set of rollers, located in the flow path of the substrate upstream of the nip roller (5). Also these laminations, using the same films, or release-coated paper, as above discussed, were examined for streaking, enclosed air, or other lamination defects.

The laminations thus made were all free of flaws. No streaking, enclosed air or any other defects were observed.

In a similar fashion, laminations were made using the same type of films, but the other adhesives depicted in Examples 2 to 6 of Table 1. The results were as good as those obtained with the adhesive compositions of Examples 1 and 7.

In order to demonstrate the improvement in gloss that can be obtained with the present invention, laminations were prepared with the same substrates using both a hot melt adhesive and a waterbase adhesive. The hot melt adhesive composition comprised 4 wt-% A-C 540 Copolymer (ethylene acrylic acid copolymer), 56.5 wt-% Escorene UL 15019 CC (ethylene vinyl acetate copolymer), 18.7 wt-% Escorez 5000 (DCPD tackifying resins), 0.4 wt-% Irganox 1010 FF, 0.2 wt-% Irganox 1076 FF, Irganox PS800 FL, 10 wt-% Kristalex F100 (alpha methyl styrene tackifying resin) and 10 wt-% Lotryl 35 BA 320 (ethylene n-butyl acrylate copolymer). The hot melt adhesive had a Ring & Ball Softening Point of 95° C. and a Brookfield viscosity of 20,000 mPas at 175° C. The hot melt adhesive was coated onto 12 micron orientated polypropylene film (OPP) with the non-contact coating method, as previously described, at a coat weight of 8 g/m$^2$. The adhesive OPP was then contacted and bonded to printed paperstock. The same film and printed paperstock were also laminated with a waterbase adhesive using conventional application techniques. The gloss of the samples was measured with a BYK-Chemie Tri-Gloss Multi-Angle Reflectometer according to ASTM D-523 employing a 20° angle. The gloss values were as follows:

|  | Example 9 Medium Grey | Example 10 Off-White | Example 11 Light Blue |
| --- | --- | --- | --- |
| Paper-no film/ no adhesive | 5.3 | 7.0 | 5.5 |
| Paper/Film- no adhesive | 8.8 | 12.0 | 27.2 |
| Waterbase Adhesive | 42.9 | 41.2 | 48.5 |
| Hot Melt Adhesive | 63.6 | 73.4 | 64 |

Gloss is a measure of the capacity of a surface to reflect light in a mirror-like manner. The light is reflected at an equal but opposite angle as the angle of incidence. Accordingly, in the case of laminations having a transparent film, the gloss value is dependent to some extent on the color of the printed paperstock. Dark colors tend to absorb light, resulting in lower gloss values in comparison to lighter color. In general, however, it is evident from the test results that the adhesive contributes significantly to the overall gloss. Further, the hot melt adhesive is amenable to higher gloss measurements in comparison to the water base adhesive. The improvement is gloss ranges from about 10% to in excess of 75%, depending on the color of the printed paper stock.

Additional laminations of transparent film and printed paper were prepared with other substrates. Examples 12 and 13 employ a 135 g/m$^2$ printed carton stock for the production of an automobile poster. The adhesive composition and application technique of the present invention advantageously produces high gloss values for black print. Examples 14 and 15 employ a blue ink that tends to be bleached by conventional water borne acrylic laminating emulsions. Example 16 represents a laminant for use as a magazine cover in which a 120 g/m$^2$ printed carton stock was laminated to a 8 micron PET film with 10 g/m$^2$ of the adhesive. Example 17 represents a digital print lamination. Digital printing is produced by precipitating ink powder onto paper, similar to a copying machine. The gloss results for each of these examples are as follows:

|  | Printed Paper | Paper/Film | Paper/Adhesive/Film |
| --- | --- | --- | --- |
| Example 12 Light gray | 1.4 | 37.2 | 59.2 |
| Example 13 Black | 5.3 | 23.4 | 60.1 |
| Example 14 Light Blue | 1.4 | 9.1 | 65.5 |
| Example 15 Dark Blue | 4.1 | 63.1 | 78.9 |
| Example 16 Medium Blue | N/T | N/T | 36.6 |
| Example 17 Green | N/T | N/T | 49.2 |

N/T-not tested

What is claimed is:

1. A method of coating, wherein a thermoplastic material, which has been thermally made flowable, is provided in the form of a substantially continuous nonporous film without contact of the film with a substrate and said film is then coated onto a nonporous substrate, said coating having a complex viscosity of less than about 500 poise at about 1000 radians/sec at the coating temperature, said method further comprising transferring said continuous film from said first substrate to a second substrate.

2. A method of coating, wherein a thermoplastic material, which has been thermally made flowable, is provided in the form of a substantially continuous nonporous film without contact of the film with a substrate and said film is then coated onto a nonporous substrate, said coating having a complex viscosity of less than about 500 poise at about 1000 radians/sec at the coating temperature, said method further comprising nipping said coated substrate and contacting the coating of said nipped substrate with a second substrate.

3. A method of coating, comprising releasing a hot melt adhesive, which has been thermally made flowable, from a coating device onto a substantially nonporous substrate as a substantially continuous coating without contact between said coating device and said substrate, subsequently disposing said substantially continuous coating upon the surface of said substrate at a coating weight of less than about 10 g/m$^2$;

nipping said coated substrate between a first roller and a second roller; and contacting the coating of said nipped substrate with a second substrate.

4. The method of claim 3, wherein said fist substrate comprises film and said second substrate comprises foil.

5. The method of claim 3, wherein said first substrate comprises foil and said second substrate comprises film.

6. The method of claim 3, wherein at least one of said first substrate and said second substrate comprises metallized film.

7. The method of claim 3, wherein said first substrate comprises film and said second substrate comprises paper.

8. A method of coating a substrate, said method comprising releasing a hot melt adhesive that has been thermally made flowable from a coating device in the form of a substantially continuous film without contact between said coating device and a substrate; and contacting the surface of a substrate comprising a substantially nonporous moving web with said continuous film to form a coated substrate having a continuous coating having an area weight less than about 30 g/m$^2$, said coated substrate being essentially free of entrapped air between the coating and the substrate.

9. The method of claim 8, wherein said coating has an area weight of less than about 10 g/m$^2$.

10. The method of claim 8, further comprising nipping said continuous film and said substrate between a first roller and a second roller.

11. The method of claim 10, wherein said contacting and said nipping occur substantially simultaneously.

12. The method of claim 8, wherein said substrate comprises a polymeric film.

13. The method of claim 8, wherein said substrate comprises foil.

14. The method of claim 8, wherein said substrate comprises metallized polymeric film.

15. The method of claim 8, wherein the substrate of said coated substrate is a fist substrate, said method further comprising contacting the coating of said coated substrate with a second substrate.

16. The method of claim 15, wherein said second substrate comprises a polymeric film.

17. The method of claim 15, wherein said second substrate comprises foil.

18. The method of claim 15, wherein said second substrate comprises metallized polymeric film.

19. The method of claim 15, wherein said second substrate comprises paper.

20. The method of claim 16, wherein said first substrate comprises a polymeric film.

21. The method of claim 17, wherein said first substrate comprises foil.

22. The method of claim 17, wherein said fist substrate comprises polymeric film.

23. The method of claim 18, wherein said first substrate comprises metallized polymeric film.

24. The method of claim 8, wherein said hot melt adhesive has a complex viscosity of less than about 500 poise at 1000 radians/sec at the coating temperature.

25. The method of claim 24, wherein said hot melt adhesive has a complex viscosity of less than about 1000 poise at 1 radians/sec at the coating temperature.

26. The method of claim 8, wherein the adhesive composition is released from the coating device at a temperature less than about 177° C.

27. The method of claim 8, wherein the adhesive composition is released from the coating device at a temperature less than about 160° C.

28. The method of claim 8, wherein the adhesive composition is released from the coating device at a temperature less than about 125° C.

29. The method of claim 8, wherein the adhesive composition is released from the device at a temperature less than about 110° C.

30. The method of claim 8, wherein the distance between the coating device and the substrate is greater than 20 mm.

31. The method of claim 8, wherein the coating device is a slot nozzle.

* * * * *

UNITED STATES PATENT AND TRADEMARK OFFICE
CERTIFICATE OF CORRECTION

PATENT NO. : 6,843,874 B1
DATED : January 18, 2005
INVENTOR(S) : Annegret Janssen It is certified that error appears in the above-identified patent and that said Letters Patent is hereby corrected as shown below:

Column 14,
Line 64, "said fist substrate" should read -- said first substrate --.

Column 15,
Line 33, "a fist substrate" should read -- a first substrate --.

Column 16,
Line 11, "said fist substrate" should read -- said first substrate --.
Line 30, "from the device" should read -- from the coating device --.

Signed and Sealed this

Twenty-first Day of June, 2005

JON W. DUDAS
*Director of the United States Patent and Trademark Office*